(12) United States Patent
Han et al.

(10) Patent No.: US 9,187,625 B2
(45) Date of Patent: Nov. 17, 2015

(54) METHOD OF PREPARING HIGH REFRACTIVE NANOPARTICLES, NANOPARTICLES PREPARED BY THE METHOD, AND PHOTONIC CRYSTAL DEVICE USING THE NANOPARTICLES

(75) Inventors: Moon Gyu Han, Yongin-si (KR); HongShik Shim, Seoul (KR); Chang Gyun Shin, Anyang-si (KR); Seog-jin Jeon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/477,311

(22) Filed: May 22, 2012

(65) Prior Publication Data

US 2013/0050809 A1    Feb. 28, 2013

(30) Foreign Application Priority Data

Aug. 24, 2011 (KR) ........................ 10-2011-0084818

(51) Int. Cl.

| G02F 1/00 | (2006.01) |
|---|---|
| G02B 26/08 | (2006.01) |
| G02F 1/29 | (2006.01) |
| C08K 9/08 | (2006.01) |
| C09C 1/36 | (2006.01) |

(Continued)

(52) U.S. Cl.
CPC . *C08K 9/08* (2013.01); *B82Y 30/00* (2013.01); *C09C 1/04* (2013.01); *C09C 1/043* (2013.01); *C09C 1/3676* (2013.01); *C01P 2002/85* (2013.01); *C01P 2002/88* (2013.01); *C01P 2004/03* (2013.01); *C01P 2004/04* (2013.01); *C01P 2004/62* (2013.01); *C01P 2004/64* (2013.01); *Y10T 428/2982* (2013.01)

(58) Field of Classification Search
USPC .......... 359/321–324, 290–292, 295, 296, 298
See application file for complete search history.

(56) References Cited

U.S. PATENT DOCUMENTS

| 4,703,018 A | 10/1987 | Craig et al. |
| 7,008,567 B2 | 3/2006 | Foulger et al. |

(Continued)

FOREIGN PATENT DOCUMENTS

| CN | 1387069 A | 12/2002 |
| CN | 1490657 A | 4/2004 |

(Continued)

OTHER PUBLICATIONS

European Search Report mailed Dec. 17, 2012, issued in European Application No. 12181081.6.

(Continued)

*Primary Examiner* — Joseph P Martinez
*Assistant Examiner* — Brandi Thomas
(74) *Attorney, Agent, or Firm* — Harness, Dickey & Pierce, P.L.C.

(57) ABSTRACT

A method of preparing high refractive index nanoparticles includes adding a polymer stabilizer to a solvent, and forming high refractive index nanoparticles by adding high refractive index nanoparticle materials to the solvent and stirring the same. The high refractive index nanoparticle materials may have a refractive index equal to or greater than 1.8, and sizes of the high refractive index nanoparticles may be determined by adjusting a content of the polymer stabilizer to control an amount of the polymer stabilizer adsorbed to surfaces of the high refractive index nanoparticles.

22 Claims, 19 Drawing Sheets

(51) Int. Cl.
  *C09C 1/04* (2006.01)
  *B82Y 30/00* (2011.01)

(56) References Cited

U.S. PATENT DOCUMENTS

| | | | |
|---|---|---|---|
| 7,364,673 | B2 | 4/2008 | Arsenault et al. |
| 7,459,283 | B2 * | 12/2008 | Wertz et al. ............... 435/18 |
| 7,719,744 | B2 * | 5/2010 | Won et al. ............... 359/245 |
| 7,741,378 | B2 | 6/2010 | Cui |
| 8,076,846 | B2 * | 12/2011 | Mizuno et al. ............... 313/512 |
| 2002/0173610 | A1 | 11/2002 | Aert et al. |
| 2003/0162393 | A1 | 8/2003 | Sato et al. |
| 2005/0185254 | A1 | 8/2005 | Moon et al. |
| 2006/0182968 | A1 | 8/2006 | Yoshida et al. |
| 2007/0201124 | A1 | 8/2007 | Whitesides et al. |
| 2008/0230752 | A1 | 9/2008 | Bower et al. |
| 2009/0034051 | A1 | 2/2009 | Arsenault et al. |
| 2009/0202714 | A1 * | 8/2009 | Mandzy et al. ............... 427/164 |
| 2009/0326081 | A1 | 12/2009 | Irgum et al. |
| 2011/0068676 | A1 | 3/2011 | Jeon et al. |
| 2012/0139960 | A1 * | 6/2012 | Shin et al. ............... 345/690 |

FOREIGN PATENT DOCUMENTS

| | | |
|---|---|---|
| JP | 10-130021 A | 5/1998 |
| JP | 11-217722 | 10/1999 |
| KR | 10-2007-0041027 A | 4/2007 |
| KR | 10-2009-0019781 A | 2/2009 |
| KR | 10-2010-0034499 A | 4/2010 |
| WO | WO-2009/065639 A1 | 5/2009 |

OTHER PUBLICATIONS

Hung-Wen Su, et al., "Photosensitive High-Refractive-Index Poly(acrylic acid)-graft-Poly(ethylene glycol methacrylate) Nanocrystalline Titania Hybrid Films," *Macromol. Chem. Phys.*, V. 209, pp. 1778-1786 (2008).

Changli Lu, et al., "High refractive index organic-inorganic nanocomposites: design, synthesis and application," *J. Mater. Chem.*, vol. 19, pp. 2884-2901 (2009).

Hosein, et al., "Homogenous, Core—Shell, and Hollow-Shell ZnS Colloid-Based Photonic Crystals," *Langmuir*, vol. 23, pp. 2892-2897 (2007).

U.S. Office Action dated Sep. 30, 2013, issued in U.S. Appl. No. 13/517,789.

Final Office Action for corresponding U.S. Appl. No. 13/064,287, dated Oct. 1, 2014.

Changli Lü, et al. "High refractive index organic-inorganic nanocomposites: design, synthesis and application", The Royal Society of Chemistry, vol. 19, pp. 2884-2901, (2009).

Chinese Office Action dated Jan. 7, 2015 issued in corresponding Chinese Application No. 201210185668.9 (Full English translation enclosed).

Office Action dated May 9, 2014 for corresponding U.S. Appl. No. 13/517,789.

U.S. Office Action dated May 8, 2015 issued in U.S. Appl. No. 13/517,789.

\* cited by examiner

METHOD OF PREPARING HIGH REFRACTIVE NANOPARTICLES, NANOPARTICLES PREPARED BY THE METHOD, AND PHOTONIC CRYSTAL DEVICE USING THE NANOPARTICLES

CROSS-REFERENCE TO RELATED APPLICATIONS

This application claims the benefit of Korean Patent Application No. 10-2011-0084818, filed on Aug. 24, 2011, in the Korean Intellectual Property Office, the disclosure of which is incorporated herein in its entirety by reference.

BACKGROUND

1. Field

Example embodiments relate to methods of preparing high refractive index nanoparticles, nanoparticles prepared by the methods, and/or photonic crystal devices using the nanoparticles.

2. Description of the Related Art

High refractive index nanoparticles, which strongly interact with light, are important materials in the optical field. Accordingly, many attempts to use high refractive index nano particles, e.g., $TiO_2$, CdS, $SnO_2$, ZnO, $ZrO_2$, and CdSe, in the optical field have recently been made.

From among high refractive index materials, Group II-VI or III-V compound semiconductors may control bandgaps by using a chemical method or a quantum confinement method, and thus are considered desirable optical materials. Although research on such materials has been actively conducted, existing materials are nanoparticles having a size equal to or less than 50 nm or particles having a size close to a micro size. Accordingly, there is a limitation in preparing nanoparticles having a uniform mesoscopic size distribution.

Because particles having a mesoscopic size may interact with light in a visible band, the particles having a mesoscopic size may be used in various fields including displays. For example, particles having a mesoscopic size may constitute photonic crystals by using self-assembly. Photonic crystals have a grid structure in which two or more materials having different refractive indices are regularly arranged in a two-dimensional (2D) or three-dimensional (3D) manner. Such photonic crystals having a grid structure have a photonic bandgap through which light having a specific wavelength may be blocked or passed due to a periodic distribution of refractive indices.

SUMMARY

Example embodiments provide methods of preparing high refractive index nanoparticles having a uniform size distribution and/or photonic devices using the high refractive index nanoparticles.

Additional aspects will be set forth in part in the description which follows and, in part, will be apparent from the description, or may be learned by practice of the example embodiments.

According to example embodiments, a method of preparing high refractive index nanoparticles includes adding a polymer stabilizer to a solvent, and forming high refractive index nanoparticles by adding high refractive index nanoparticle materials to the solvent and stirring the same. The high refractive index nanoparticle materials may have a refractive index equal to or greater than 1.8, and sizes of the high refractive index nanoparticles may be determined by adjusting a content of the polymer stabilizer to control an amount of the polymer stabilizer adsorbed to surfaces of the high refractive index nanoparticles.

The forming may form nanoparticles including at least one of ZnS, $TiO_2$, ZnO, and $ZrO_2$. The adding may add one of polyvinylpyrrolidone (PVP), polyethylene glycol (PEG), polyacrylic acid, or polyvinyl alcohol (PVA) to the solvent. The adding may add the polymer stabilizer to the solvent in an amount from about 0.25 wt % to about 2 wt %.

The forming may form the high refractive index nanoparticles to have a diameter from about 50 nm to about 300 nm. The forming may include coating the high refractive index nanoparticles with a transparent material to form a core-shell structure. The transparent material may be silica.

According to example embodiments, high refractive index nanoparticles may be prepared by a method including adding a polymer stabilizer to a solvent, and forming high refractive index nanoparticles by adding high refractive index nanoparticle materials to the solvent and stirring the same. The high refractive index nanoparticle materials may have a refractive index equal to or greater than 1.8, and sizes of the high refractive index nanoparticles may be determined by adjusting a content of the polymer stabilizer to control an amount of the polymer stabilizer adsorbed to surfaces of the high refractive index nanoparticles.

The high refractive index nanoparticles may include one of ZnS, $TiO_2$, ZnO, and $ZrO_2$. The polymer stabilizer may be one of polyvinylpyrrolidone (PVP), polyethylene glycol (PEG), polyacrylic acid, and polyvinyl alcohol (PVA). A content of the polymer stabilizer in the solvent may be from about 0.25 wt % to 2 wt %. A diameter of the high refractive index nanoparticles may be from about 50 nm to about 300 nm. Surfaces of the high refractive index nanoparticles may be coated with a transparent material to have a core-shell structure. The transparent material may be silica.

According to example embodiments, a photonic crystal device may include photonic crystals formed through self-assembly by high refractive index nanoparticles prepared by a method. The method may include adding a polymer stabilizer to a solvent, and forming high refractive index nanoparticles by adding high refractive index nanoparticle materials to the solvent and stirring the same. The high refractive, index nanoparticle materials may have a refractive index equal to or greater than 1.8, and sizes of the high refractive index nanoparticles may be determined by adjusting a content of the polymer stabilizer to control an amount of the polymer stabilizer adsorbed to surfaces of the high refractive index nanoparticles.

The photonic crystals may be fixed. The photonic crystals may include a colloidal solution having the high refractive index nanoparticles dispersed in the solvent, and the photonic crystal device may further include electrodes configured to apply an electric field to the colloidal solution. A photonic stop band of the photonic crystals including the high refractive index nanoparticles may continuously vary in at least a visible band according to a voltage applied to the electrodes. The electrodes may be spaced apart from each other having the colloidal solution therebetween. The photonic crystal device may be a tunable color filter having a visible band as the photonic stop band, or a full-color reflective display device for displaying an arbitrary color of the visible band.

Because the method of example embodiments controls sizes and a degree of dispersion of high refractive index nanoparticles by using a polymer stabilizer, nanoparticles having a mesoscopic size may be more easily prepared in one step. Accordingly, because the nanoparticles have a uniform mesoscopic size distribution, a photonic crystal device having a photonic bandgap of a visible band may be more easily realized.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1A:
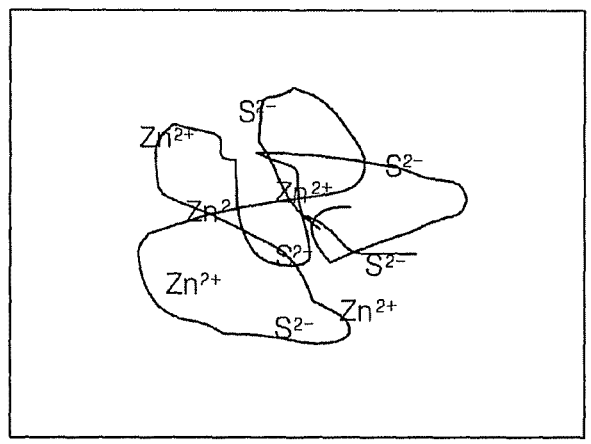
FIGS. 1A through 1D illustrate a process in which ZnS nanoparticles grow.

The inventive concepts will now be described more fully with reference to the accompanying drawings, in which example embodiments are shown. In the drawings, the same reference numerals denote the same elements, and sizes or thicknesses of elements may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

A method of preparing high refractive index nanoparticles according to example embodiments includes adding a polymer stabilizer to a solvent, stirring the same, adding raw materials, carrying out a reaction for a predetermined or given period of time, and synthesizing high refractive index nanoparticles, wherein sizes and a degree of dispersion of the high refractive index nanoparticles are adjusted by adjusting the content of the polymer stabilizer in the solvent to control the amount of the polymer stabilizer adsorbed to surfaces of the high refractive index nanoparticles. The high refractive index nanoparticles may be ZnS, $TiO_2$, ZnO, or $ZrO_2$, each of which has a refractive index equal to or greater than 1.8.

The raw materials from which the high refractive index nanoparticles are prepared may be well-known raw materials. The polymer stabilizer may be polyvinylpyrrolidone (PVP), polyethylene glycol (PEG), polyacrylic acid, or polyvinyl alcohol (PVA), and the content of the polymer stabilizer in the solvent may range from about 0.25 wt % to about 2 wt %. The high refractive index nanoparticles prepared by using the method may be monodispersed particles which have predetermined or given particle diameters according to the content of the polymer stabilizer in the solvent, and sizes of the high refractive index nanoparticles may be controlled in one step from the adding of the raw materials to the synthesizing of the high refractive index nanoparticles.

Diameters of the high refractive index nanoparticles may be controlled to range from about 50 nm to about 300 nm by controlling the polymer stabilizer, and a distribution of the sizes of the high refractive index nanoparticles may be less than 5% such that the high refractive index nanoparticles have a uniform size distribution.

Figure 1B:
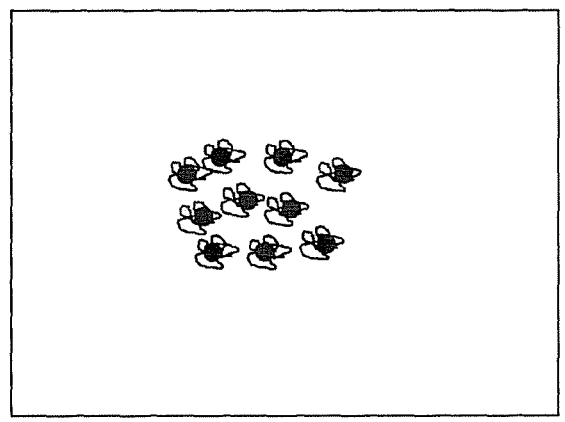
Figure 1C:
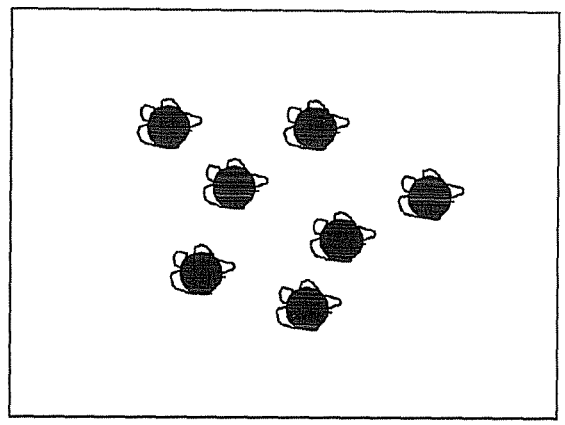
Figure 1D:
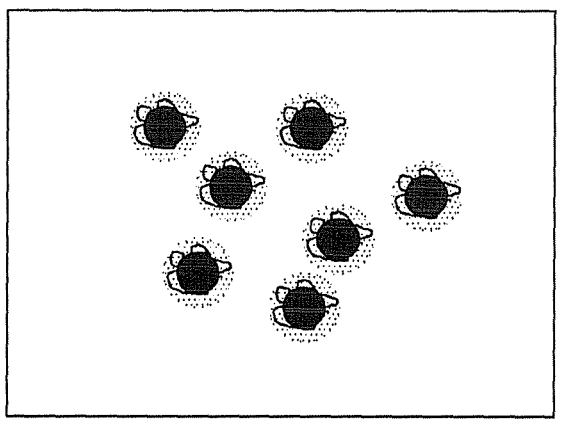

FIGS. 1A through 1D illustrate a process in which ZnS nanoparticles grow. As shown in FIG. 1A, when raw materials of zinc (Zn) and sulfur (S) dissolve in a solvent to which a predetermined or given polymer stabilizer is added, Zn ions and S ions combine with each other to form ZnS seed crystals as shown in FIG. 1B. The ZnS seed crystals grow as nuclei of colloidal particles as shown in FIG. 1C, the polymer stabilizer is adsorbed to surfaces of growing particles to control aggregation, and ZnS nanoparticles having a uniform mesoscopic size distribution are formed as shown in FIG. 1D. A conventional method of preparing ZnS nanoparticles having a mesoscopic size includes forming ZnS seed crystals, growing small particles through nucleation, and controlling aggregation of the small particles in an additional step. However, in a method of preparing ZnS nanoparticles having a mesoscopic size according to example embodiments, because forming of ZnS seed crystals, performing of nucleation, and controlling of aggregation are performed in one step, and sizes of the ZnS nanoparticles are controlled by using the amount of a polymer stabilizer initially added, the sizes of the ZnS nanoparticles may be controlled in one step.

The method of preparing ZnS nanoparticles will be explained in detail as follows. 200 ml of deionized water is poured into a flask, and 0.2 to 2 g of PVP is added as a polymer stabilizer, and is stirred to dissolve. A temperature of a reactor is increased to between about 60 and about 80° C., and 0.1 mole of thioacetamide is added. 0.1 to 0.2 mole of zinc nitrate hexahydrate is added and stirred for 3 hours to cause a reaction, thereby forming ZnS nanoparticles.

Figure 2A:
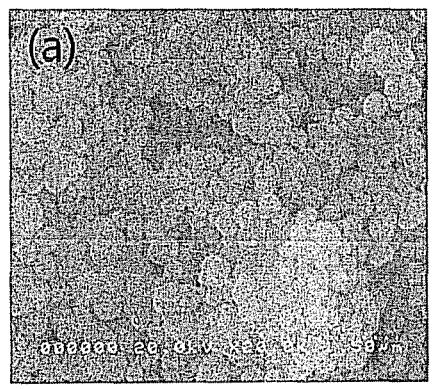
FIGS. 2A through 2C are scanning electron microscope (SEM) images of ZnS nanoparticles prepared when polyvinylpyrrolidone (PVP) is not used and used.
Figure 2B:
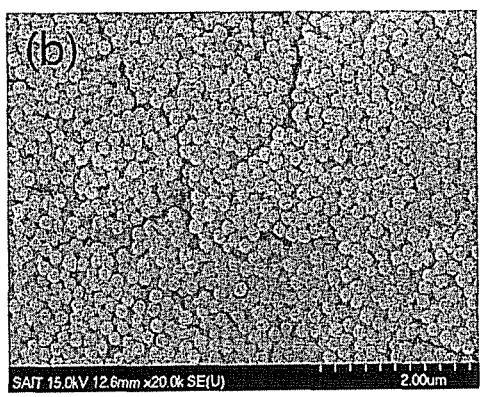
Figure 2C:
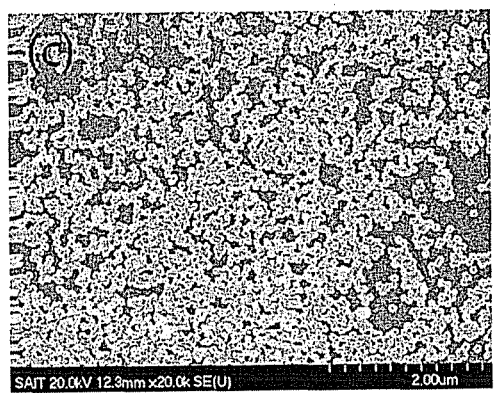

FIG. 2A is a scanning electron microscope (SEM) image of ZnS nanoparticles when PVP is not used as a stabilizer. FIGS. 2B and 2C are SEM images of ZnS nanoparticles when 0.5 g of PVP and 1 g of PVP are respectively used as a stabilizer in the aforesaid method. Referring to FIG. 2A, the ZnS nanoparticles prepared without using PVP as a stabilizer have random sizes. However, referring to FIGS. 2B and 2C, sizes and degrees of dispersion of the ZnS nanoparticles prepared when PVP is used as a stabilizer are uniformly controlled. Also, the ZnS nanoparticles of FIG. 2B have sizes of about 200 nm, and the ZnS nanoparticles of FIG. 2C have sizes of about 100 nm. Accordingly, as the amount of PVP used as a stabilizer increases, sizes of the ZnS nanoparticles decrease. Accordingly, growth of the ZnS nanoparticles may be controlled by adsorbing PVP used as a stabilizer onto surfaces of the ZnS nanoparticles.

Figure 3A:
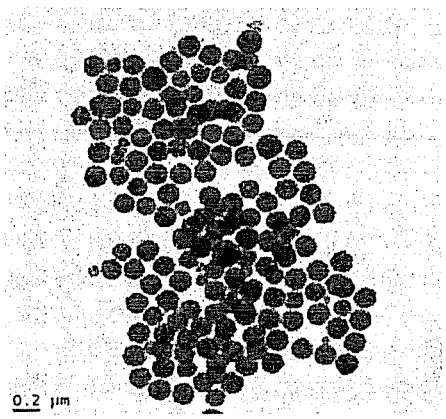
FIGS. 3A through 3C are transmission electron microscope (TEM) images of various ZnS nanoparticle sizes of which are controlled.
Figure 3B:
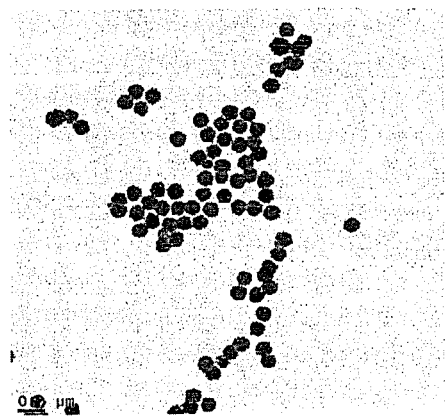
Figure 3C:
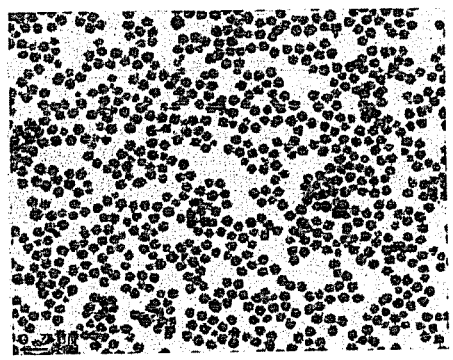
Figure 3D:
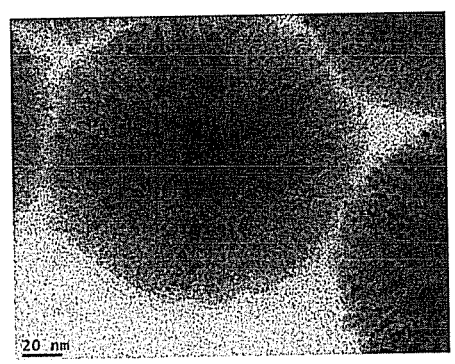
FIG. 3D is a magnified image of FIG. 3C.

FIGS. 3A through 3C are transmission electron microscope (TEM) images of various ZnS nanoparticle sizes of which are controlled. FIG. 3D is a magnified image of FIG. 3C. FIG. 3A illustrates a case where ZnS nanoparticles are formed by using 0.5 g of PVP as a stabilizer, 0.1 mole of thioacetamide, and 0.2 mole of zinc nitrate hexahydrate when a temperature of a reactor is 80° C. FIG. 3B illustrates a case where ZnS nanoparticles are formed by using 0.75 g of PVP as a stabilizer under the same experimental condition as that of FIG. 3A. FIG. 3C illustrates a case where ZnS nanoparticles are formed by using 1 g of PVP as a stabilizer under the same experimental condition as that of FIG. 3A. In FIGS. 3A through 3C, sizes of the ZnS nanoparticles are controlled appropriately. Also, in FIG. 3D, PVP is adsorbed to surfaces of the ZnS nanoparticles and protected.

Figure 4:
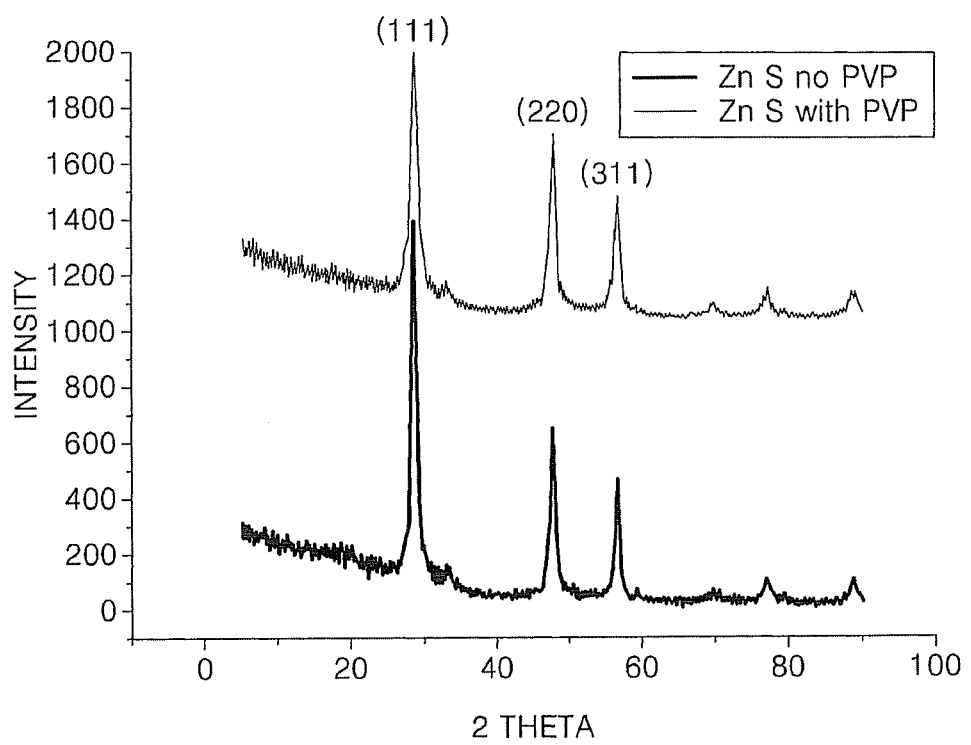
FIG. 4 is a graph illustrating wide angle X-ray diffraction patterns of ZnS nanoparticles prepared when PVP is used and not used.

FIG. 4 is a graph illustrating wide angle X-ray diffraction patterns of ZnS nanoparticles prepared when PVP is used and not used. Referring to FIG. 4, ZnS nanoparticles using PVP as a stabilizer have substantially the same cubic β-ZnS structure as that of conventional ZnS nanoparticles not using PVP as a stabilizer. That is, a crystal structure of ZnS nanoparticles even when PVP is used as a stabilizer as shown in example embodiments is not changed.

Figure 5A:
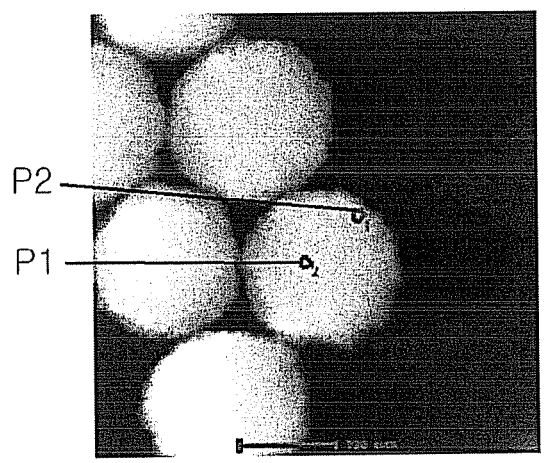
FIG. 5A is a magnified image of ZnS nanoparticles.
Figure 5B:
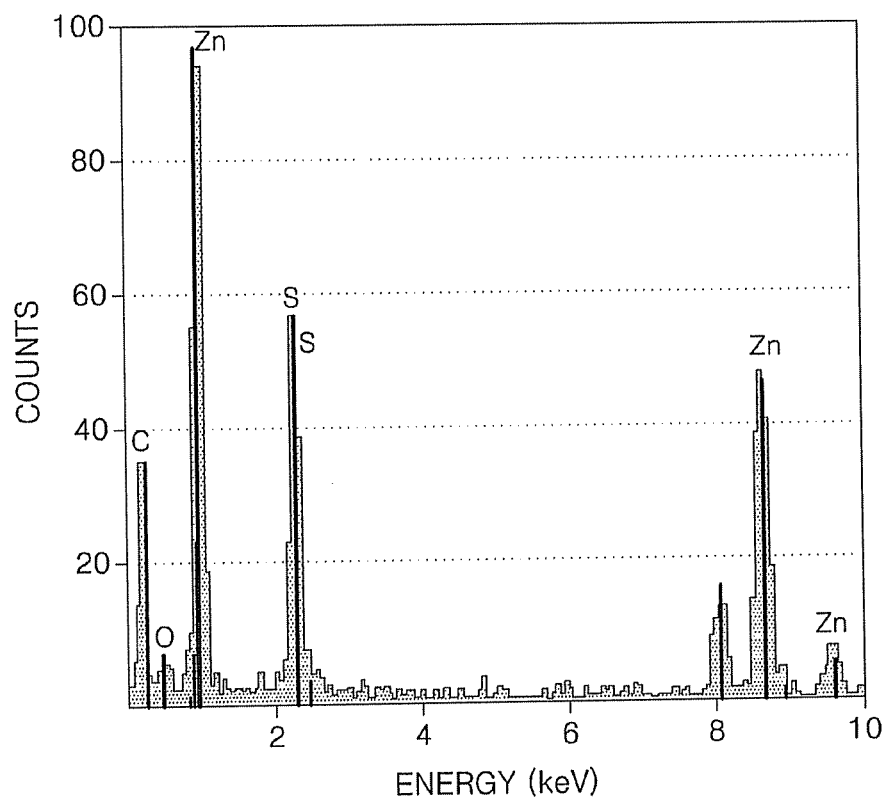
FIG. 5B illustrates a result of energy dispersive X-ray (EDX) elemental analysis performed at a central portion of each of ZnS nanoparticles.
Figure 5C:
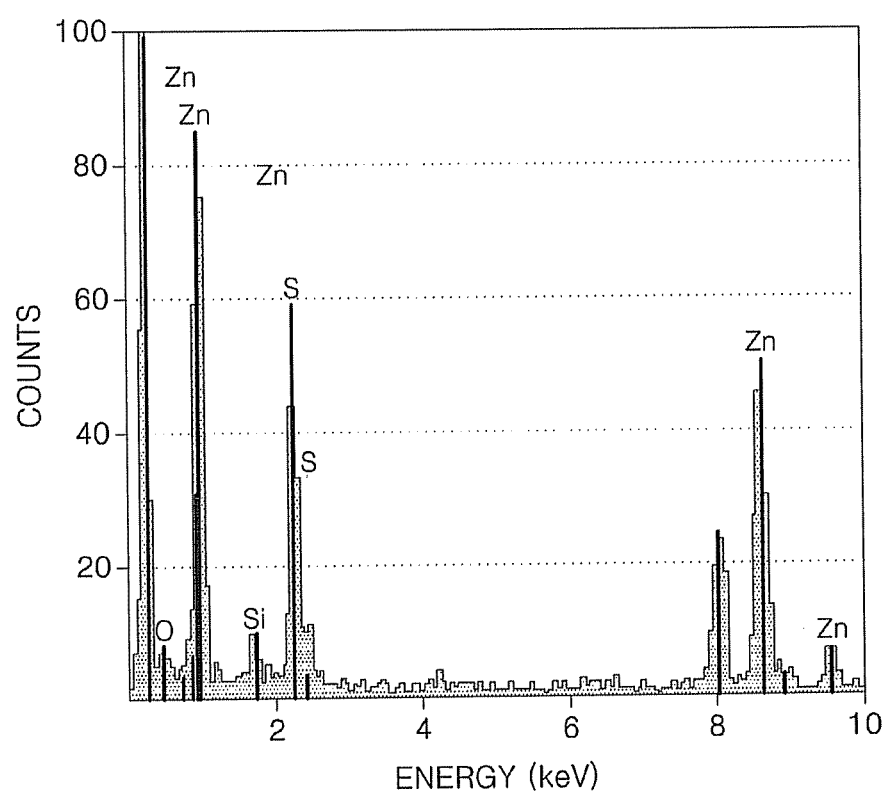
FIG. 5C illustrates a result of EDX elemental analysis performed at an end portion of each of the ZnS nanoparticles.

FIG. 5A is a magnified image of ZnS nanoparticles prepared by the aforesaid method. FIG. 5B illustrates a result of energy dispersive X-ray (EDX) elemental analysis performed at a central portion P1 (see FIG. 5A) of each of the ZnS nanoparticles. FIG. 5C illustrates a result of EDX elemental analysis performed at an end portion P2 (see FIG. 5A) of each of the ZnS nanoparticles. As shown in FIGS. 5B and 5C, atomic compositions at the central portion P1 and the end portion P2 of each of the ZnS nanoparticles are different from each other. Because silicon (Si) does not exist and the content of carbon (C) is high at the end portion P2, PVP seems to be adsorbed to surfaces of the ZnS nanoparticles.

Figure 6:
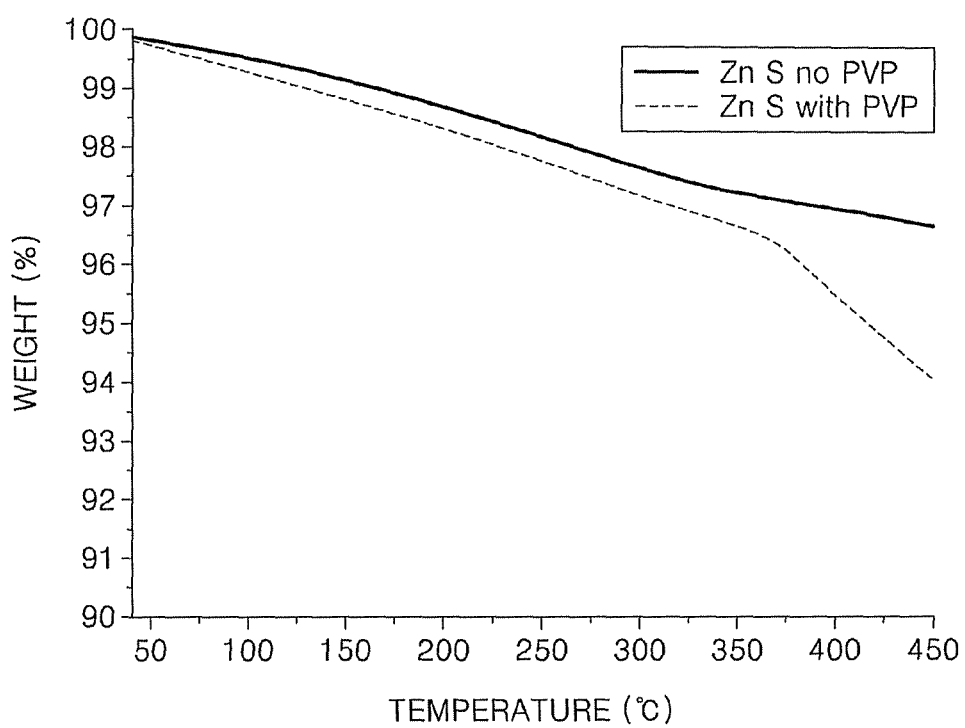
FIG. 6 illustrates a result of thermogravimetric analysis (TGA) performed on ZnS nanoparticles.

FIG. 6 illustrates a result of thermogravimetric analysis (TGA) performed on ZnS nanoparticles prepared by the aforesaid method. Referring to FIG. 6, a weight is reduced due to thermal cracking of PVP adsorbed to surfaces of ZnS nanoparticles when the PVP is used. When the ZnS nanoparticles are formed by using the PVP, the PVP is adsorbed to the surfaces of the ZnS nanoparticles.

A method of preparing high refractive index nanoparticles according to example embodiments includes adding a polymer stabilizer to a solvent, stirring the same, adding raw materials, carrying out a reaction for a predetermined or given period of time, synthesizing high refractive index nanoparticles, and forming a core-shell structure by adding a silica coating material. Sizes of the high refractive index nanoparticles are uniformly controlled by using the polymer stabilizer, and optical characteristics of the high refractive index nanoparticles may be adjusted by enabling the high refractive index nanoparticles to have the core-shell structure.

The method of preparing high refractive index nanoparticles will be explained in detail as follows. 20 ml of ZnS colloidal solution (1 wt %, the content of a solid) is prepared.

The ZnS colloidal solution may be a solution of ZnS nanoparticles prepared by the aforesaid method. 1 ml of ammonia and 2 ml of deionized water are added to the ZnS colloidal solution, and stirred for 1 hour. 0.05 to 1 g of tetraethyl orthosilicate is added as a silica coating material, and a reaction is carried out for 5 hours, thereby forming ZnS nanoparticles coated with silica.

Figure 7A:
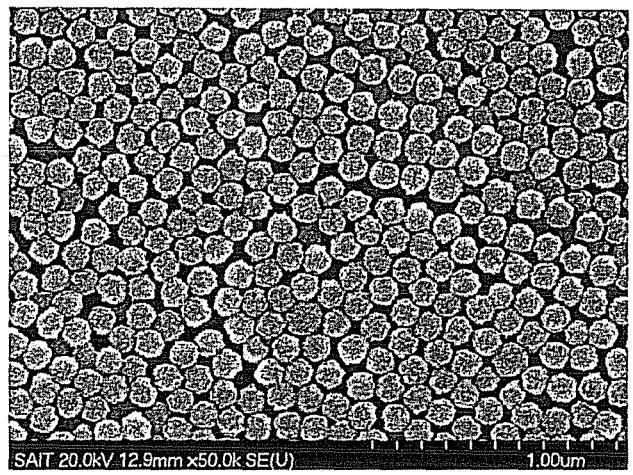
FIGS. 7A through 7D are SEM and TEM images of ZnS nanoparticles before and after the ZnS nanoparticles are coated with silica.
Figure 7B:
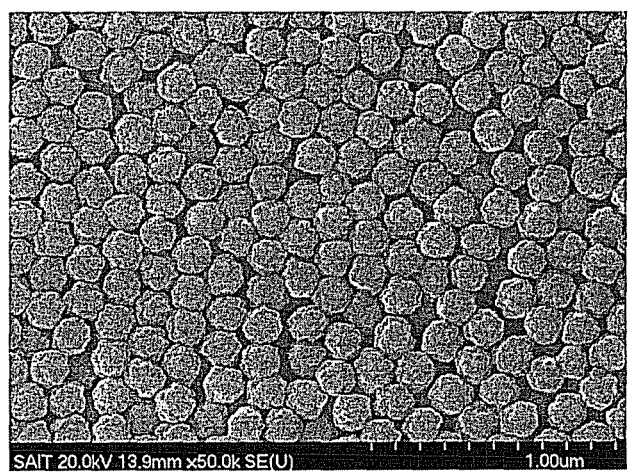
Figure 7C:
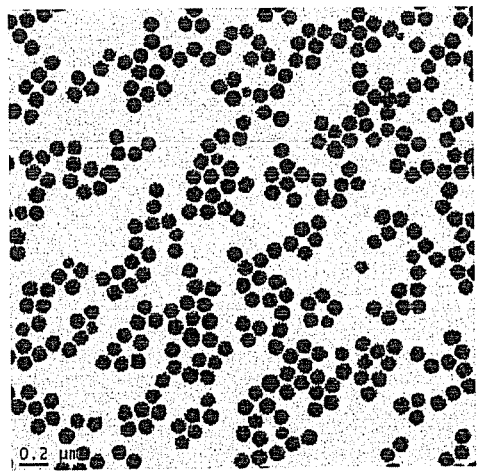
Figure 7D:
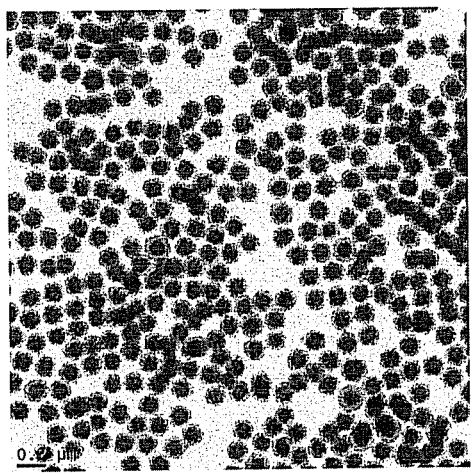

FIG. 7A is an SEM image of ZnS nanoparticles before the ZnS nanoparticles are coated with silica. FIG. 7B is an SEM image of ZnS nanoparticles after the ZnS nanoparticles are coated with silica. Likewise, FIG. 7C is a TEM image of ZnS nanoparticles before the ZnS nanoparticles are coated with silica. FIG. 7D is a TEM image of ZnS nanoparticles after the ZnS nanoparticles are coated with silica. In FIGS. 7A through 7D, a silica layer having a thickness of about 20 nm may be uniformly coated on each of the ZnS nanoparticles.

Figure 8A:
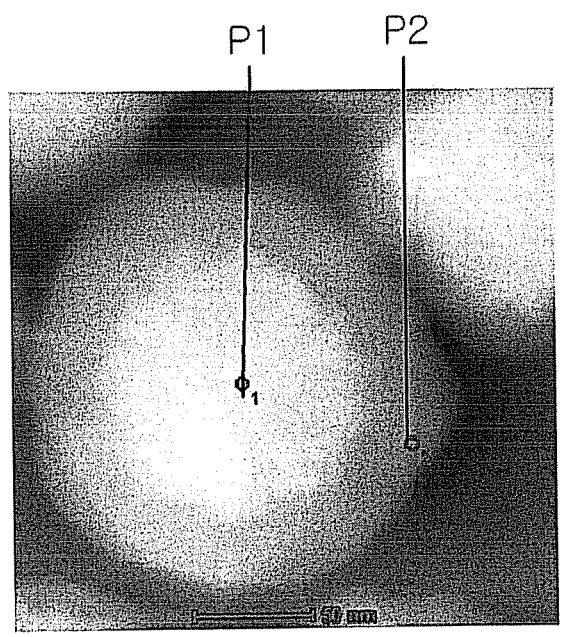
FIG. 8A is a magnified image of ZnS nanoparticles coated with silica.
Figure 8B:
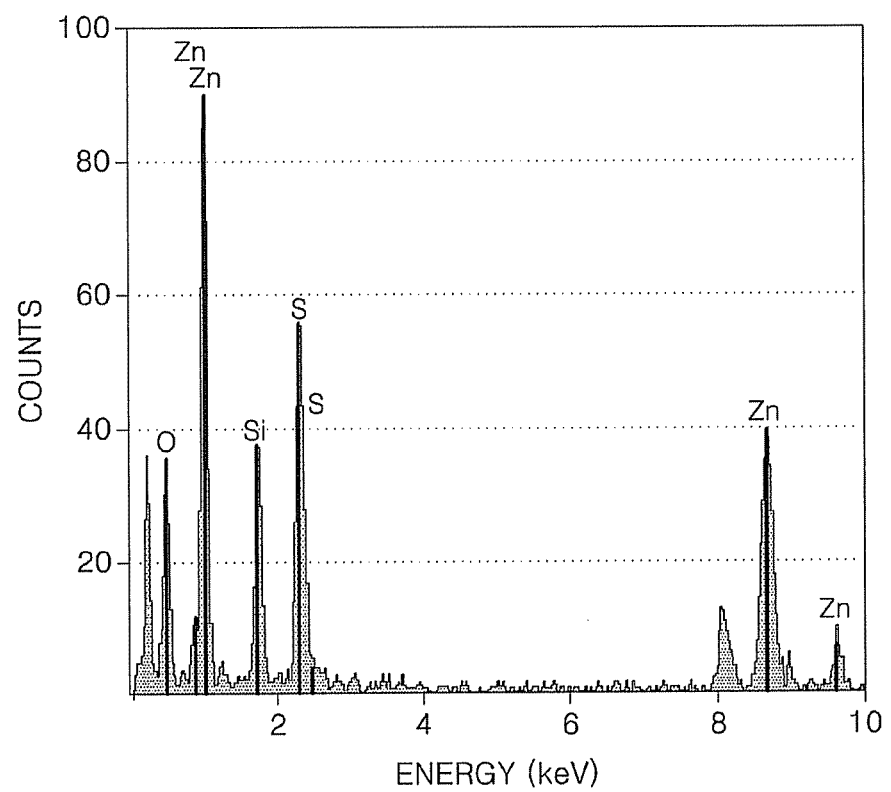
FIG. 8B illustrates a result of EDX elemental analysis performed at a central portion of each of ZnS nanoparticles coated with silica.
Figure 8C:
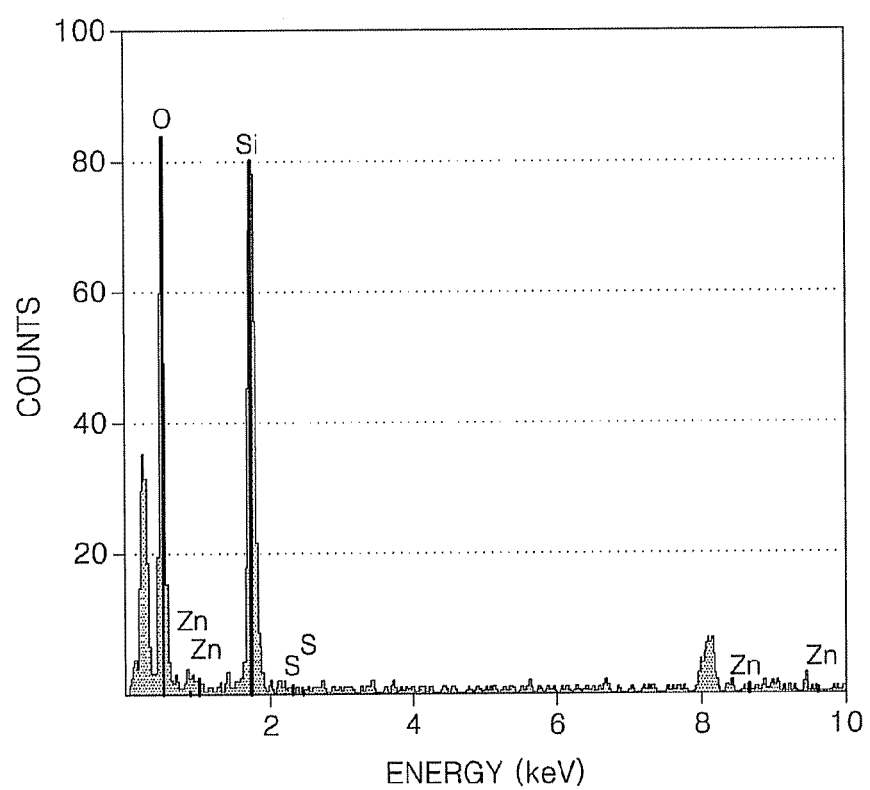
FIG. 8C illustrates a result of EDX elemental analysis performed at a shell portion of each of the ZnS nanoparticles.

FIG. 8A is a magnified image of ZnS nanoparticles coated with silica prepared by the aforesaid method. FIG. 8B illustrates a result of EDX elemental analysis performed at a central portion P1 (see FIG. 8A) of each of ZnS nanoparticles coated with silica. FIG. 8C illustrates a result of EDX elemental analysis performed at a shell portion P2 (see FIG. 8A) of each of the ZnS nanoparticles. In FIGS. 8A through 8C, the ZnS nanoparticles coated with silica have a core-shell structure, and the content of Si at the central portion P1 is 20%, the content of Si at the shell portion P2 that is a silica-rich portion is about 100%, and atomic compositions of Zn and S are almost the same at the central portion P1 and the shell portion P2.

Because ZnS, $TiO_2$, ZnO, or $ZrO_2$ nanoparticles prepared by the aforesaid method are materials having a refractive index higher than that of silica having a refractive index of 1.46 or polystyrene having a refractive index of 1.59 which is often used to prepare photonic crystals in a conventional method, if photonic crystals are formed by using ZnS, $TiO_2$, ZnO, or $ZrO_2$ nanoparticles as described below, a higher reflectivity may be obtained, the width of a reflection spectrum may be increased, and photonic crystals including a desired wavelength band may be more easily designed.

Figure 9A:
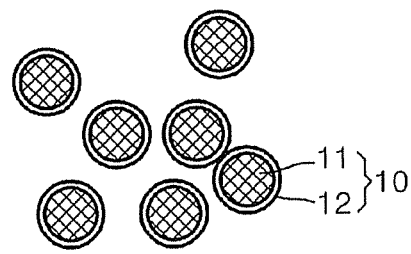
FIGS. 9A through 9C illustrate arrangements of high refractive index nanoparticles.
Figure 9B:
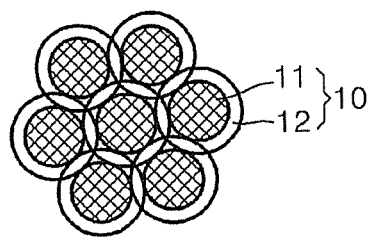
Figure 9C:
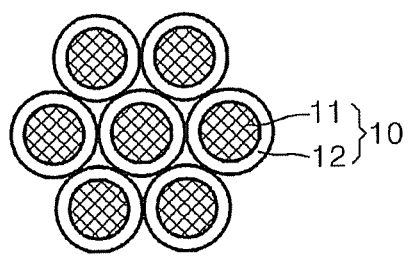

FIGS. 9A through 9C illustrate arrangements of high refractive index nanoparticles prepared by the aforesaid method. Nanoparticles 10 prepared by the aforesaid method dissolve in a solvent to form a colloidal solution. In example embodiments, surfaces of the nanoparticles (colloidal particles) 10 are charged to the same charge polarity. As shown in FIG. 9A, the nanoparticles 10 in the colloidal solution are electrically charged due to adsorption of ions and dissociation of surface polar groups in the solution to each have a particle body 11 and a charged area 12. The nanoparticles 10 are arranged in a disordered manner at an initial stage. In example embodiments, the charged area 12 may include a layer to which counter-ions are adsorbed and which is not easily moved, and an electric double layer which is slightly spaced apart from the layer and is more easily moved.

A relatively small amount of raw materials and polymer stabilizer in the colloidal solution which do not undergo a reaction may be removed by being subjected to, for example, dialysis or by using an ion-exchange resin. Once the raw materials and the polymer stabilizer which do not undergo a reaction are removed, the nanoparticles 10 including the electric double layer form colloidal crystals having a face-centered cubic (FCC) structure, a body-centered cubic (BCC) structure, or a close-packed hexagonal (HCP) structure by using self-assembly. An interval between the nanoparticles 10 in the colloidal crystals may be controlled by the concentration of the nanoparticles 10, and the concentration of the nanoparticles 10 may vary according to the zeta potential of the nanoparticles 10, and/or the ionic strength of the solvent. Also, because the concentration of the nanoparticles 10 may be controlled by an electrical stimulation as described below, the colloidal crystals may be applied to a tunable photonic crystal device.

When external light is emitted due to periodic characteristics, the colloidal crystals become photonic crystals having a photonic bandgap through which light having a specific wavelength is reflected and light having other wavelengths is transmitted due to constructive interference. Because the nanoparticles 10 have a mesoscopic size of about 50 nm to about 300 nm as described above, photonic crystals have a photonic bandgap in a visible band. As shown in FIGS. 9B and 9C, when an interval between the nanoparticles 10 is changed in the colloidal crystals, a photonic bandgap is changed, and thus, a wavelength band of reflected light is moved.

Figure 10:
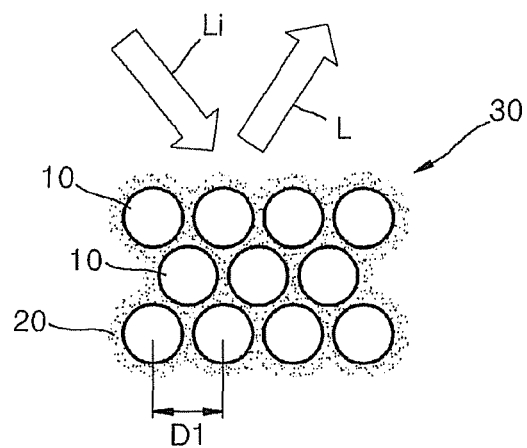
FIG. 10 is a view illustrating a photonic crystal device according to example embodiments.

FIG. 10 is a view illustrating a photonic crystal device 30 according to example embodiments. Referring to FIG. 10, the photonic crystal device 30, which reflects only light L including a specific wavelength band from light from an external source Li, includes the high refractive index nanoparticles 10 having a photonic crystal structure. The photonic crystal structure may have a photonic bandgap which corresponds to a reflection wavelength band due to self-assembly. In example embodiments, the photonic crystal structure may be fixed by adding a material for attaching the high refractive index nanoparticles 10 to a solvent 20. For example, the photonic crystal structure may be fixed by adding a photoinitiator and a cross-linker to the solvent 20, maintaining an ordered state of the high refractive index nanoparticles 10, and performing exposure to ultraviolet (UV) light to cause photopolymerization.

The reflection wavelength band of the photonic crystal device 30 may be adjusted by appropriately adjusting an interval D1 between the high refractive index nanoparticles 10, and the interval D1 between the high refractive index nanoparticles 10 may be adjusted by appropriately determining the zeta potential of the nanoparticles 10 or the ionic strength of the solvent 20. For example, the photonic crystal device 30 may be used as a blue display device for reflecting blue light, a green display device for reflecting green light, or a red display device for reflecting red light by appropriately determining the interval D1.

Figure 11:
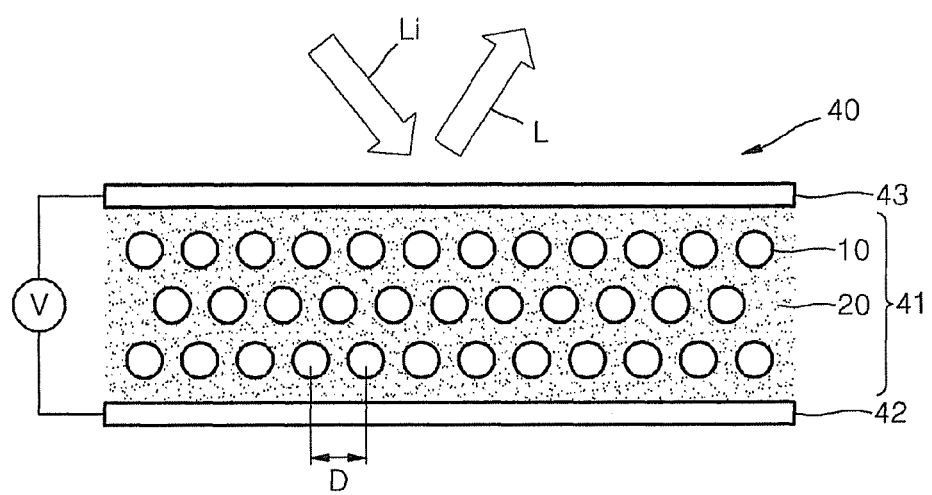
FIG. 11 is a view illustrating a photonic crystal device according to example embodiments.

FIG. 11 is a view illustrating a photonic crystal device 40 according to example embodiments. Referring to FIG. 11, the photonic crystal device 40, which is a tunable photonic crystal device for modulating a color of light L reflected from an external source Li in real time, may include a colloidal solution 41 in which the high refractive index nanoparticles 10 are dispersed in the solvent 20, and electrodes 42 and 43 which apply a voltage V to the colloidal solution 41.

The high refractive index nanoparticles 10 may be high refractive index nanoparticles prepared by the aforesaid method, and form photonic crystals by using self-assembly due to an electrical double layer. The solvent 20 may be a polar solvent, e.g., deionized water or alcohol.

The electrodes 42 and 43 may be spaced apart from each other by a predetermined or given distance as shown in FIG. 11. The photonic crystal device 40 may have a matrix structure in which a plurality of cells are arranged to which voltages are independently applied. In example embodiments, one of the electrodes 42 and 43 may be a pixel electrode which may independently apply a voltage, and the other electrode may be a common electrode. The pixel electrode and the common electrode may be used in a conventional display panel. The electrodes 42 and 43 may be transparent electrodes, and in example embodiments, the photonic crystal device 40 reflects light L having a specific wavelength from among light from an external source Li and transmits all other light. Alternatively, if an electrode at an incident side (for example, the electrode 42) is a transparent electrode and the other electrode (for example, the electrode 43) is coated with a light-absorbing material, the tunable photonic crystal device 40 may reflect light L having a specific wavelength and absorb all other light.

When a voltage V is applied to the electrodes 42 and 43, an electric field is formed between the electrodes 42 and 43, and the high refractive index nanoparticles 10 which are charged in the colloidal solution 41 receive an electrical force exerted by the electric field and are moved to one side due to electro-kinetic phenomena. For example, the high refractive index nanoparticles 10 which are negatively charged are moved to a positive electrode. When the high refractive index nanoparticles 10 are moved to one side due to an external electric field to increase a concentration of the high refractive index nanoparticles 10, balance with a repulsive force due to charging is achieved, thereby leading to an ordered structure. If the voltage V is reduced, an electric field applied to the high refractive index nanoparticles 10 is reduced and a concentration of the high refractive index nanoparticles 10 is reduced, thereby increasing the interval D between the high refractive index nanoparticles 10.

Once the interval D between the high refractive index nanoparticles 10 is changed, a photonic bandgap of photonic crystals formed by the high refractive index nanoparticles 10 is changed, thereby changing a photonic stop band. For example, if the voltage V is reduced and the interval D between the high refractive index nanoparticles 10 is increased, the photonic stop band is changed from a blue wavelength to a red wavelength. The tunable photonic crystal device 40 may variably reflect full colors ranging from blue to red according to the magnitude of the voltage V, and furthermore variably reflect a wide area including a visible band ranging from UV light to infrared light. Accordingly, the photonic crystal device 40 may be used as a one pixel full color reflective display device or a tunable color filter having a visible band as a photonic stop band. Also, the photonic crystal device 40 may be applied to a wavelength-tunable laser, a sensor, an e-skin, and/or an indicator.

A width $\Delta\omega$ of a reflection spectrum in a structure including two materials having different refractive indices is defined by $$\Delta\omega = \frac{4\omega_0}{\pi}\sin^{-1}\left(\frac{|n_L - n_H|}{n_L + n_H}\right) \Rightarrow R = \qquad (1)$$

$$\frac{\Delta\omega}{\Delta\omega_{total}} \approx \frac{4}{\pi}\frac{\omega_0}{\Delta\omega_{total}}\left\{\left(1 - \frac{2}{n_H/n_L + 1}\right) + ...\right\}.$$

Referring to Equation 1, the width $\Delta\omega$ of the reflection spectrum increases as a refractive index ratio nH/nL between the two materials increases.

Figure 12:
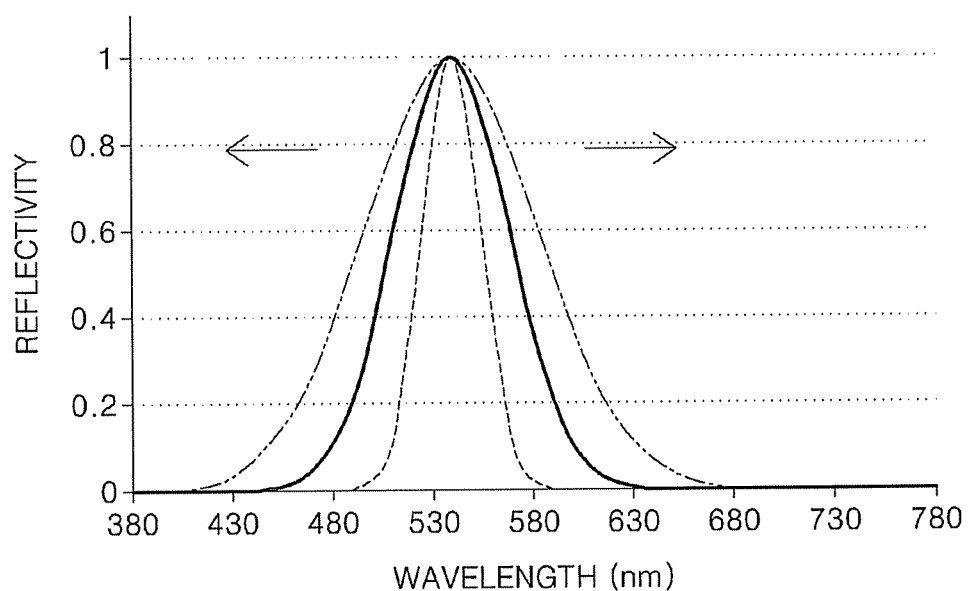
FIG. 12 illustrates reflection spectrums of the photonic crystal devices when a refractive index ratio between particles and a medium increases.

FIG. 12 illustrates reflection spectrums of the photonic crystal devices 30 and 40 of FIGS. 10 and 11. As shown in Equation 1, as a refractive index ratio between particles constituting photonic crystals and a medium increases, a width of a reflection spectrum increases as shown in FIG. 12. In FIG. 12, because an area of a reflection spectrum is a total amount of light reflected by a photonic crystal device, as the width L of the reflection spectrum increases, a total amount of light reflected by any of the photonic crystal devices 30 and 40 increases. Accordingly, when a refractive index of a medium is constant, a total amount of light reflected by a photonic crystal device increases. Because nanoparticles prepared in the above example embodiments have high refractive indices, if the photonic crystal devices 30 and 40 using the nanoparticles are used as display devices, the display devices may be reflective display devices having a higher reflectivity and higher visibility.

Figure 13:
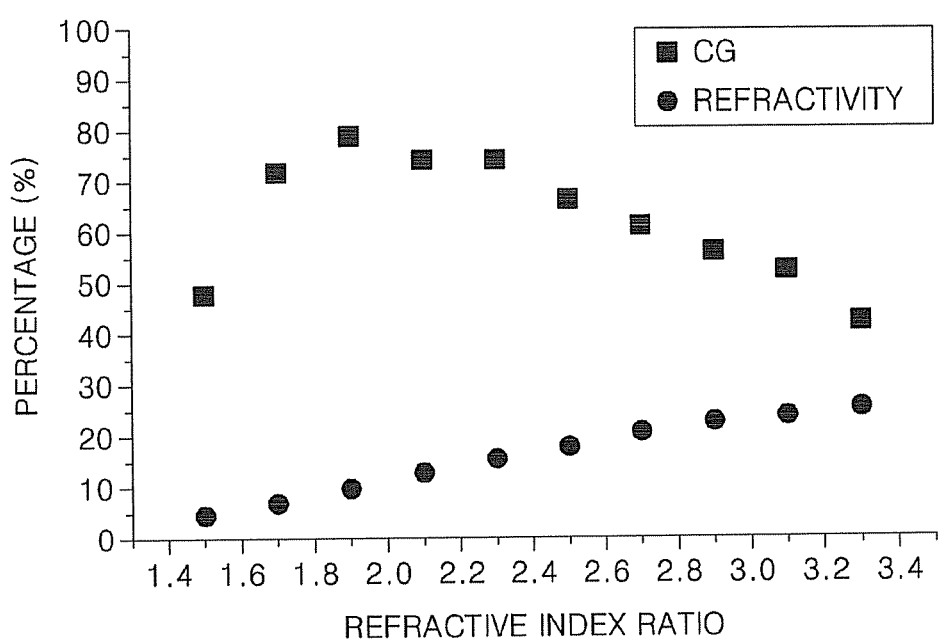
FIG. 13 is a graph illustrating a relationship between a reflectivity and a color gamut, and a refractive index ratio between particles and a solvent in an aqueous solution.

FIG. 13 is a graph illustrating a relationship between a reflectivity and a color gamut, and a refractive index ratio between a solvent and particles in an aqueous solution. As shown in FIG. 13, because appropriate reflectivity and color gamut may be determined by adjusting a refractive index ratio between particles and a solvent, the photonic crystal devices 30 and 40 of FIGS. 10 and 11 may be used as reflective display devices having an improved color gamut.

While the inventive concepts have been particularly shown and described with reference to example embodiments thereof, it will be understood by one of ordinary skill in the art that various changes in form and details may be made therein without departing from the spirit and scope as defined by the following claims.

What is claimed is:

1. A method of preparing high refractive index nanoparticles, the method comprising:
adding a polymer stabilizer to a solvent; and
forming high refractive index nanoparticles by adding high refractive index nanoparticle materials to the solvent and stirring the same, the high refractive index nanoparticle materials having a refractive index equal to or greater than 1.8,
wherein sizes of the high refractive index nanoparticles are determined by adjusting a content of the polymer stabilizer to control an amount of the polymer stabilizer adsorbed to surfaces of the high refractive index nanoparticles, and
wherein the high refractive index nanoparticles are ZnS nanoparticles.

2. The method of claim 1, wherein the adding adds one of polyvinylpyrrolidone (PVP), polyethylene glycol (PEG), polyacrylic acid, or polyvinyl alcohol (PVA) to the solvent.

3. The method of claim 2, wherein the adding adds the polymer stabilizer to the solvent in an amount from about 0.25 wt % to about 2 wt %.

4. The method of claim 1, wherein the forming forms the high refractive index nanoparticles to have a diameter from about 50 nm to about 300 nm.

5. The method of claim 1, wherein the forming includes coating the high refractive index nanoparticles with a transparent material to form a core-shell structure.

6. The method of claim 5, wherein the transparent material is silica.

7. High refractive index nanoparticles prepared by a method comprising:
adding a polymer stabilizer to a solvent; and
forming high refractive index nanoparticles by adding high refractive index nanoparticle materials to the solvent and stirring the same, the high refractive index nanoparticle materials having a refractive index equal to or greater than 1.8,
wherein sizes of the high refractive index nanoparticles are determined by adjusting a content of the polymer stabilizer to control an amount of the polymer stabilizer adsorbed to surfaces of the high refractive index nanoparticles, and
wherein the high refractive index nanoparticles are ZnS nanoparticles.

8. The high refractive index nanoparticles of claim 7, wherein the polymer stabilizer is one of polyvinylpyrrolidone (PVP), polyethylene glycol (PEG), polyacrylic acid, and polyvinyl alcohol (PVA).

9. The high refractive index nanoparticles of claim 8, wherein a content of the polymer stabilizer in the solvent is from about 0.25 wt % to 2 wt %.

10. The high refractive index nanoparticles of claim 7, wherein a diameter of the high refractive index nanoparticles is from about 50 nm to about 300 nm.

11. The high refractive index nanoparticles of claim 7, wherein surfaces of the high refractive index nanoparticles are coated with a transparent material to have a core-shell structure.

12. The high refractive index nanoparticles of claim 11, wherein the transparent material is silica.

13. A photonic crystal device comprising:
photonic crystals formed through self-assembly by high refractive index nanoparticles prepared by a method, the method including,
adding a polymer stabilizer to a solvent, and
forming high refractive index nanoparticles by adding high refractive index nanoparticle materials to the solvent and stirring the same, the high refractive index nanoparticle materials having a refractive index equal to or greater than 1.8,
wherein sizes of the high refractive index nanoparticles are determined by adjusting a content of the polymer stabilizer to control an amount of the polymer stabilizer adsorbed to surfaces of the high refractive index nanoparticles, and
wherein the high refractive index nanoparticles are ZnS nanoparticles.

14. The photonic crystal device of claim 13, wherein the polymer stabilizer is one of polyvinylpyrrolidone (PVP), polyethylene glycol (PEG), polyacrylic acid, and polyvinyl alcohol (PVA).

15. The photonic crystal device of claim 13, wherein a content of the polymer stabilizer in the solvent is from about 0.25 wt % to 2 wt %.

16. The photonic crystal device of claim 13, wherein a diameter of the high refractive index nanoparticles is from about 50 nm to about 300 nm.

17. The photonic crystal device of claim 13, wherein surfaces of the high refractive index nanoparticles are coated with a transparent material to have a core-shell structure.

18. The photonic crystal device of claim 17, wherein the transparent material is silica.

19. The photonic crystal device of claim 13, wherein the photonic crystals are fixed.

20. A photonic crystal device comprising:
photonic crystals including a colloidal solution having high refractive index nanoparticles dispersed in a solvent, the photonic crystals formed through self-assembly by the high refractive index nanoparticles prepared by a method, the method including,
adding a polymer stabilizer to the solvent, and
forming the high refractive index nanoparticles by adding high refractive index nanoparticle materials to the solvent and stirring the same, the high refractive index nanoparticle materials having a refractive index equal to or greater than 1.8; and
electrodes configured to apply an electric field to the colloidal solution,
wherein sizes of the high refractive index nanoparticles are determined by adjusting a content of the polymer stabilizer to control an amount of the polymer stabilizer adsorbed to surfaces of the high refractive index nanoparticles,
and
wherein a photonic stop band of the photonic crystals including the high refractive index nanoparticles continuously varies in at least a visible band according to a voltage applied to the electrodes.

21. The photonic crystal device of claim 20, wherein the electrodes are spaced apart from each other having the colloidal solution therebetween.

22. The photonic crystal device of claim 20, wherein the photonic crystal device is a tunable color filter having a visible band as the photonic stop band, or a full-color reflective display device for displaying an arbitrary color of the visible band.

* * * * *